United States Patent
Park et al.

(10) Patent No.: US 12,504,468 B2
(45) Date of Patent: Dec. 23, 2025

(54) TEST CONNECTOR

(71) Applicant: ISC CO., LTD, Gyeonggi-do (KR)

(72) Inventors: Jeong Muk Park, Gyeonggi-do (KR);
Jun Ho Lee, Gyeonggi-do (KR);
Byung Seo Jeon, Gyeonggi-do (KR);
Jong Seok Park, Gyeonggi-do (KR);
Young Bae Chung, Gyeonggi-do (KR)

(73) Assignee: Isc Co., Ltd, Gyeonggi-do (KR)

( * ) Notice: Subject to any disclaimer, the term of this patent is extended or adjusted under 35 U.S.C. 154(b) by 140 days.

(21) Appl. No.: 18/328,255

(22) Filed: Jun. 2, 2023

(65) Prior Publication Data
US 2023/0393193 A1 Dec. 7, 2023

(30) Foreign Application Priority Data

Jun. 7, 2022 (KR) .......................... 10-2022-0068979

(51) Int. Cl.
*G01R 31/28* (2006.01)
(52) U.S. Cl.
CPC ................................ *G01R 31/2889* (2013.01)
(58) Field of Classification Search
CPC ............ G01R 31/2889; G01R 31/2886; G01R 1/0416; G01R 1/06755
See application file for complete search history.

(56) References Cited

U.S. PATENT DOCUMENTS 7,309,244 B2 * 12/2007 Yamada ............. H01R 13/2414
439/91
2013/0285692 A1 10/2013 Lee
(Continued)

FOREIGN PATENT DOCUMENTS

| KR | 10-1204941 A | 11/2012 |
| KR | 10-2016-0045544 A | 4/2016 |
| KR | 10-2020-0110011 A | 9/2020 |

(Continued)

OTHER PUBLICATIONS

Chung et al (WO-2021172816-A2), machine translation (Year: 2021).*

(Continued)

*Primary Examiner* — Eman A Alkafawi
*Assistant Examiner* — Suresh K Rajaputra
(74) *Attorney, Agent, or Firm* — BakerHostetler

(57) ABSTRACT

The present disclosure provides a test connector disposed between a test device and a device to be inspected. The test connector includes at least one conductor configured to be conductive in a vertical direction and be elastically compressively deformable in the vertical direction when pressed, a support configured to support the conductor, and an insulator having at least one through hole into which the conductor is inserted in the vertical direction and being coupled to the support. A gap is formed between an inner circumferential surface of the through hole and an outer circumferential surface of the conductor. The insulator includes at least one elastic insulating layer that is elastically compressively deformable in the vertical direction and includes an elastic material, and at least one support insulating layer that is stacked in the vertical direction together with the insulating layer and has higher hardness than the insulating layer.

15 Claims, 5 Drawing Sheets

(56) References Cited

U.S. PATENT DOCUMENTS

2015/0084658 A1* 3/2015 Lee .................. G01R 1/0416
                                                          324/750.24
2021/0302494 A1* 9/2021 Oh .................. G01R 1/0466

FOREIGN PATENT DOCUMENTS

| KR | 10-2021-0108852 A | 9/2021 | | |
| KR | 10-2022-0028516 A | 3/2022 | | |
| WO | WO-2021172816 A2 * | 9/2021 | ............. | H01R 13/03 |

OTHER PUBLICATIONS

Korean Office Action, dated Mar. 20, 2024, for KR 10-2022-0068979.

Vietnamese Office Action dated Apr. 28, 2025 for VN application No. 1-2023-03638, with English language translation.

* cited by examiner

TEST CONNECTOR

CROSS-REFERENCE TO RELATED APPLICATION

This application is based upon and claims the benefit of priority from Korean Patent Application No. 10-2022-0068979, filed on Jun. 7, 2022, the entire contents of which are incorporated herein by reference.

TECHNICAL FIELD

The present disclosure relates to a test connector electrically connecting a test device with a device to be inspected.

BACKGROUND

In order to test a device to be inspected such as a semiconductor device, a test connector electrically connecting a test device with the device to be inspected has been used. The test connector is disposed between the test device and the device to be inspected. The test connector transfers an electrical test signal of the test device to the device to be inspected and transfers an electrical response signal of the device to be inspected to the test device.

The test connector has a plurality of conductors formed by aggregating a plurality of metal particles that are capable of being conductive in upper and lower directions. The conductors carry out signal transmission between the test device and the device to be inspected. In addition, the test connector has an insulator that holds the conductors in the upper and lower directions, surrounds the conductors, and serves as a housing.

SUMMARY

When only a material with high hardness, such as polyimide, is used as the material for the insulator of the above-described test connector, the insulator is not well compressed with the conductors when the test connector is pressed in the vertical direction, resulting in deterioration in the operability of the test connector. In such a case, when only an elastic material such as silicone rubber is used as the insulator, the insulator is thermally deformed due to high temperature, resulting in deterioration in the operability of the test connector.

In addition, the conductors of the above-described test connector are constrained by the insulator, thus cannot be elastically deformed or elastically restored beyond a desired level. Accordingly, there is a problem that a strong pressing force is applied to the elastic conductors and the service life of the test connector that carries out repetitive test is reduced. The present disclosure addresses such problems.

The present disclosure provides a test connector that secures the operability of the test connector and improves the lifespan of a product by distributing a pressing force while allowing the insulator to be well compressed.

The present disclosure provides a test connector that enables smooth elastic deformation of a conductor, thereby improving high operability and the lifespan of a product.

The present disclosure provides embodiments of a test connector disposed between a test device and a device to be inspected. A test connector according to a representative embodiment includes at least one conductor configured to be conductive in a vertical direction and be elastically compressively deformable in the vertical direction when pressed, a support configured to support the conductor, and an insulator having at least one through hole into which the conductor is inserted in the vertical direction and being coupled to the support. A gap is formed between the inner circumferential surface of the through hole and the outer circumferential surface of the conductor. The insulator includes at least one elastic insulating layer that is elastically compressively deformable in the vertical direction when pressed and includes an elastic material, and at least one support insulating layer that is stacked in the vertical direction together with the at least one elastic insulating layer and has a higher hardness than the at least one elastic insulating layer.

In an embodiment, the at least one elastic insulating layer may include a heat-resistant material.

In an embodiment, the heat-resistant material may include boron nitride.

In an embodiment, the heat-resistant material may include carbon or a carbon compound.

In an embodiment, the heat-resistant material may include any one selected from the group of aluminum, silicon, iron, chromium, and zirconium.

In an embodiment, the heat-resistant material may include an alloy of any one selected from the group of aluminum, silicon, iron, chromium, and zirconium.

In an embodiment, the heat-resistant material may include any one selected from the group of polyethylene, polypropylene, and polymethyl methacrylic acid.

In an embodiment, the weight ratio of the heat-resistant material to the total weight of the elastic insulating layer may be in a range of 10% to 80%.

In an embodiment, the at least one support insulating layer may include an upper end support insulating layer disposed at the upper end of the insulator.

In an embodiment, the at least one support insulating layer may include a lower end support insulating layer disposed at the lower end of the insulator.

In an embodiment, the at least one elastic insulating layer may include two elastic insulating layers disposed in the vertical direction, and the at least one support insulating layer may include an intermediate support insulating layer disposed between the two elastic insulating layers.

In an embodiment, the sum of thicknesses of the at least one elastic insulating layer in the vertical direction may be in a range of 30% to 95% of the thickness of the insulator in the vertical direction.

In an embodiment, the at least one support insulating layer may include at least one of polyimide or polytetrafluoroethylene.

In an embodiment, the support insulating layer may include FR4.

In an embodiment, the elastic material may include silicone.

In an embodiment, the elastic material may include urethane.

In an embodiment, the heat-resistant material may include any one selected from the group of (i) boron nitride, carbon or a carbon compound, (ii) any one selected from the group of aluminum, silicon, iron, chromium, and zirconium, (iii) an alloy of any one selected from the group of aluminum, silicon, iron, chromium, and zirconium, and (iv) any one selected from the group of polyethylene, polypropylene, and polymethyl methacrylic acid.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
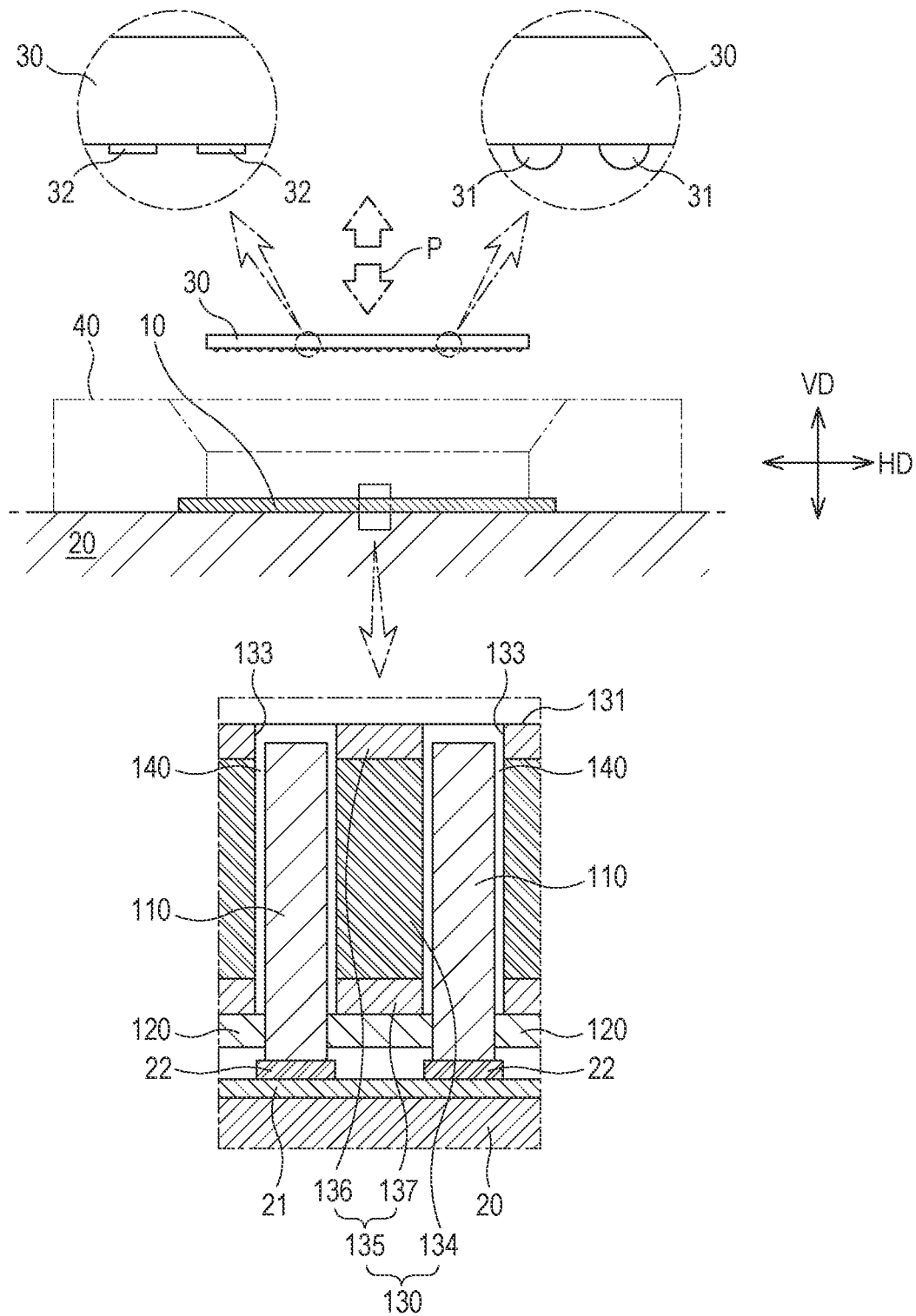
FIG. 1 is a cross-sectional view illustrating an example to which a test connector according to an embodiment of the present disclosure is applied.

Embodiments of the present disclosure are illustrated for the purpose of explaining the technical idea of the present disclosure. The scope of the rights according to the present disclosure is not limited to the embodiments presented below or the detailed descriptions of such embodiments.

All technical and scientific terms used in the present disclosure have the meaning generally understood by those of ordinary skill in the art to which the present disclosure pertains, unless otherwise defined. All terms used in the present disclosure are chosen for the purpose of more clearly describing the present disclosure and are not chosen to limit the scope of rights according to the present disclosure.

As used in the present disclosure, expressions such as "comprising," "including," "having," and the like are to be understood as open-ended terms having the possibility of encompassing other embodiments, unless otherwise mentioned in the phrase or sentence including such expressions.

The singular form described in the present disclosure may include a plural meaning, unless otherwise mentioned. This applies equally to the singular form recited in the claims.

The terms "first," "second," etc. used herein are used to distinguish a plurality of components from one another, and are not intended to limit the order or importance of the relevant components.

In the present disclosure, when it is mentioned that one element is "connected" or "coupled" to another element, it is to be understood that said one element may be directly connected or coupled to another element, or may be connected or coupled to another element via a new additional element.

As used in the present disclosure, direction indicators such as "upward," "upper," and the like are based on a direction in which a test connector is positioned relative to a test device, and direction indicators such as "downward," "lower" and the like mean the opposite direction of the upward direction. It is to be understood that a direction indicator of "vertical direction" used in the present disclosure includes upper and lower directions.

Hereinafter, embodiments of the present disclosure are described with reference to the accompanying drawings. In the accompanying drawings, the same or corresponding elements are denoted by the same reference numerals. In the following descriptions of the embodiments, descriptions of the same or corresponding elements may be omitted. However, even if the descriptions of elements are omitted, it is not intended that such elements are not included in a certain embodiment.

Embodiments described below and examples illustrated in the accompanying drawings relate to a test connector for electrical connection of two electronic devices. In the application examples of the test connector of the embodiments, one of the two electronic devices may be a test device, and the other of the two electronic devices may be a device to be inspected that is to be tested by the test device. The test connector of the embodiments may be used to electrically connect the test device and the device to be inspected when electrically testing the device to be inspected. The test connector of the embodiments may be used for a final electrical test of a semiconductor device in a post-process during a semiconductor device manufacturing process, but the examples to which the test connector of the embodiments is applied are not limited thereto.

FIG. 1 is a cross-sectional view illustrating an example to which a test connector according to an embodiment of the present disclosure is applied. FIG. 1 schematically illustrates the test connector and an electronic device that is in contact with the test connector, and the shapes illustrated in FIG. 1 are merely an example selected for understanding the embodiment.

Referring to FIG. 1, a test connector 10 is a sheet-shaped structure and may be disposed between two electronic devices. In the example illustrated in FIG. 1, one of the two electronic devices may be a test device 20 and the other may be a device to be inspected 30 which is tested by the test device 20.

The test connector 10 may be mounted in a socket housing 40 and located on the test device 20 by the socket housing 40. The socket housing 40 may be removably mounted on the test device 20. The socket housing 40 may accommodate therein the device to be inspected 30 carried to the test device 20 manually or by a transport device and may align the device to be inspected 30 with respect to the test connector 10. When the device to be inspected 30 is tested, the test connector 10 comes into contact with the test device 20 and the device to be inspected 30 in a vertical direction VD, and the test device 20 and the device to be inspected 30 are electrically connected to each other.

The device to be inspected 30 may be a semiconductor device in which a semiconductor IC chip and a plurality of terminals are packaged in a hexahedral shape by using a resin material. The device to be inspected 30 has the plurality of terminals on its bottom side. The terminals of the device to be inspected 30 may be ball-type terminals and land-type terminals having a lower height than the ball-type terminals. The device to be inspected 30 may have only ball-type first terminals 31. The device to be inspected 30 may have the ball-type first terminals 31 and land-type second terminals 32. The device to be inspected 30 may have only the land-type second terminals 32.

The test device 20 may inspect various operating characteristics of the device to be inspected 30. The test device 20 may have a board on which a test is performed, and a test circuit 21 configured to test the device to be inspected may be provided on the board. The test circuit 21 has a plurality of terminals 22 electrically connected to the terminals of the device to be inspected through the test connector 10. The terminals 22 of the test device 20 are capable of transmitting electrical test signals and receiving response signals.

The test connector 10 may be disposed to come into contact with the terminals 22 of the test device 20 by the socket housing 40. When testing the device to be inspected 30, the test connector 10 electrically connects respective terminals 31 and 32 of the device to be inspected to respective terminals 22 of the test device 20 corresponding thereto in the vertical direction VD, and the device to be inspected 30 is tested by the test device 20 via the test connector 10.

At least a portion of the test connector 10 may be made of an elastic material. For the testing of the device to be inspected 30, a pressing force P may be applied downward to the test connector 10 by a mechanical device or manually. By the pressing force P, the terminals 31 and 32 of the device to be inspected and the test connector 10 may be brought into contact with each other in the vertical direction VD, and the test connector 10 and the terminals 22 of the test device 20 may be brought into contact with each other in the vertical direction VD. Some components of the test connector 10 may be elastically deformed in a downward direction and a horizontal direction HD by the pressing force P. When the pressing force P is removed, some of the components of the test connector 10 may be restored to their original shapes.

Referring to FIG. 1, the test connector 10 includes at least one conductor 110, a support 120, and an insulator 130. The conductor 110 extends in the vertical direction VD. The conductor 110 is configured to be conductive in the vertical direction VD. The support 120 is disposed in a horizontal direction HD orthogonal to the vertical direction VD. The support 120 constitutes one surface (e.g., a bottom surface of the test connector) of the test connector 10 in the vertical direction VD. The support 120 extends in the horizontal direction HD. The support 120 supports the conductor 110. The insulator 130 is coupled to the support 120 in the vertical direction VD. The insulator 130 is disposed on the upper side of the support 120. The thickness of the insulator 130 in the vertical direction may be equal to or greater than the protruding height of the conductor 110 protruding from the support 120. The insulator 130 may have at least one through hole 133 into which the conductor 110 is inserted in the vertical direction VD.

The conductor 110 is in contact with the terminal 31 or 32 of the device to be inspected at its upper end. The conductor 110 is in contact with a terminal 22 of the test device 20 at its lower end. Accordingly, between the terminal 31 or 32 of the device to be inspected and the terminal 22 of the test device 20 corresponding to one conductor 110, a conductive path in the vertical direction VD is formed via the conductor 110. A test signal of the test device 20 may be transferred from the terminal 22 to the terminal 31 or 32 of the device to be inspected 30 via the conductor 110. A response signal of the device to be inspected 30 may be transferred from the terminal 31 or 32 to the terminal 22 of the test device 20 via the conductor 110. The upper end of the conductor 110 may form the same plane as a top surface 131 of the insulator 130 or may be located below the top surface 131 of the insulator 130.

The test connector 10 may include a plurality of conductors 110. The planar arrangement of the conductors 110 may vary depending on the arrangement of the first and second terminals 31 and 32 of the device to be inspected 30. The conductors 110 may be arranged in the form of one matrix form or in the form of one or more pairs of matrices within the insulator 130.

Figure 2:
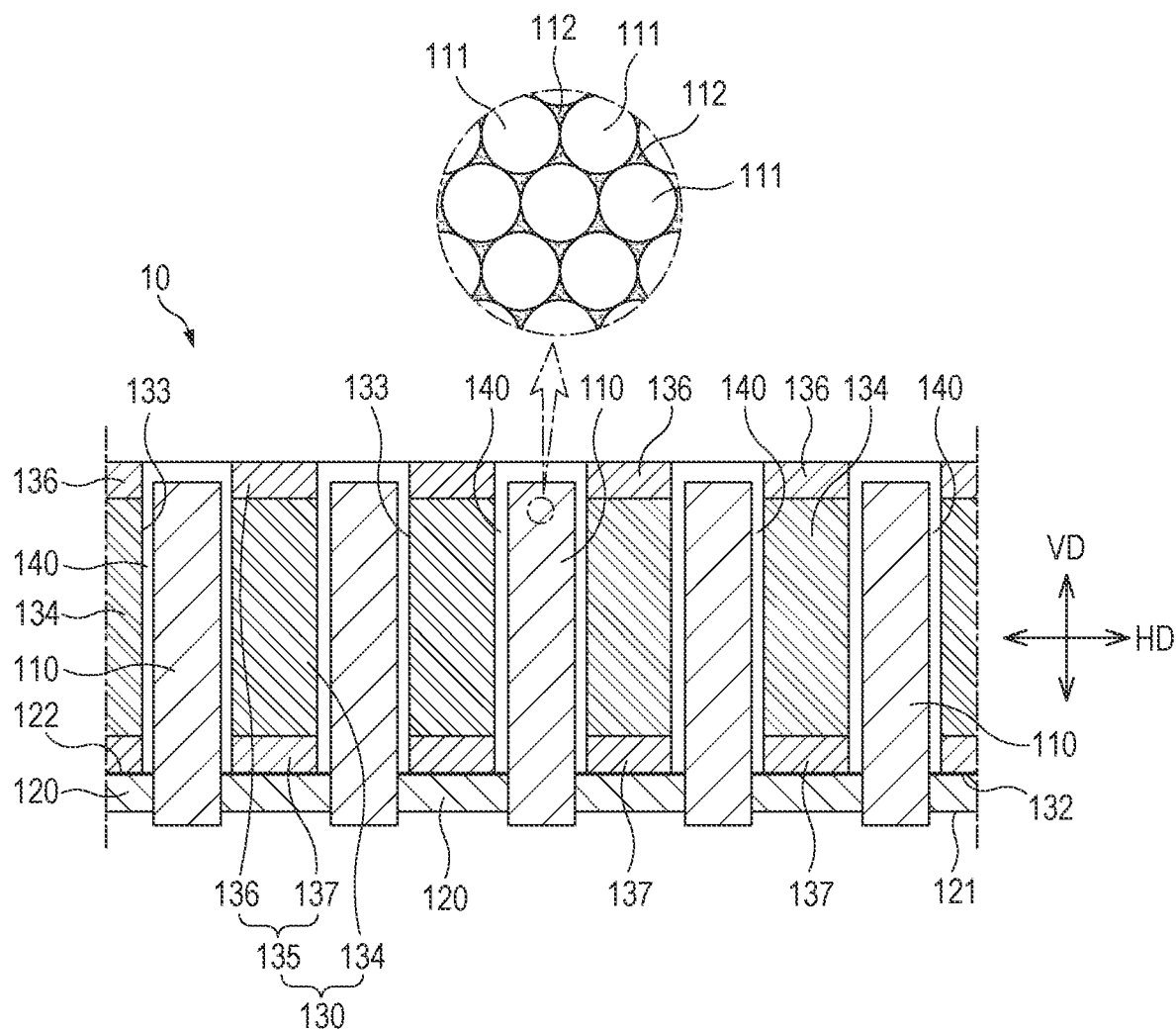
FIG. 2 is a cross-sectional view illustrating a portion of the test connector of FIG. 1.
Figure 3:
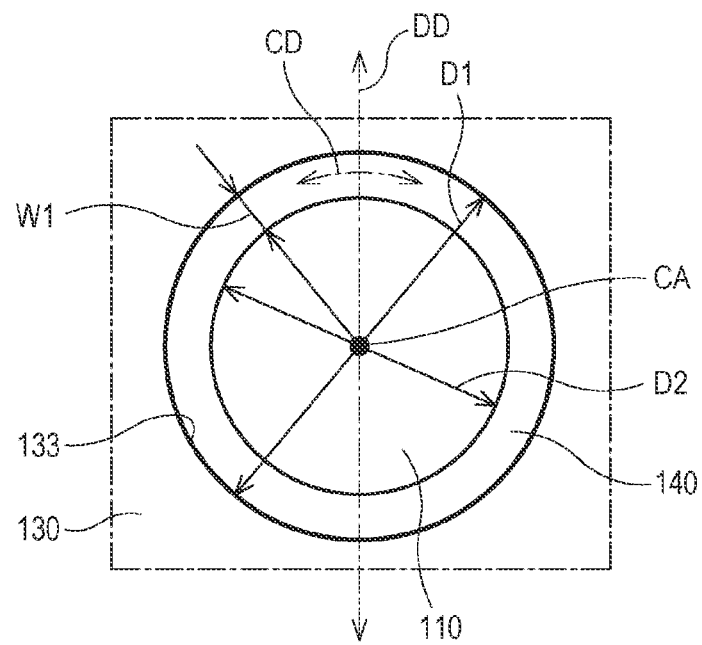
FIG. 3 is a plan view of a portion of the test connector illustrated in FIG. 2.
Figure 4:
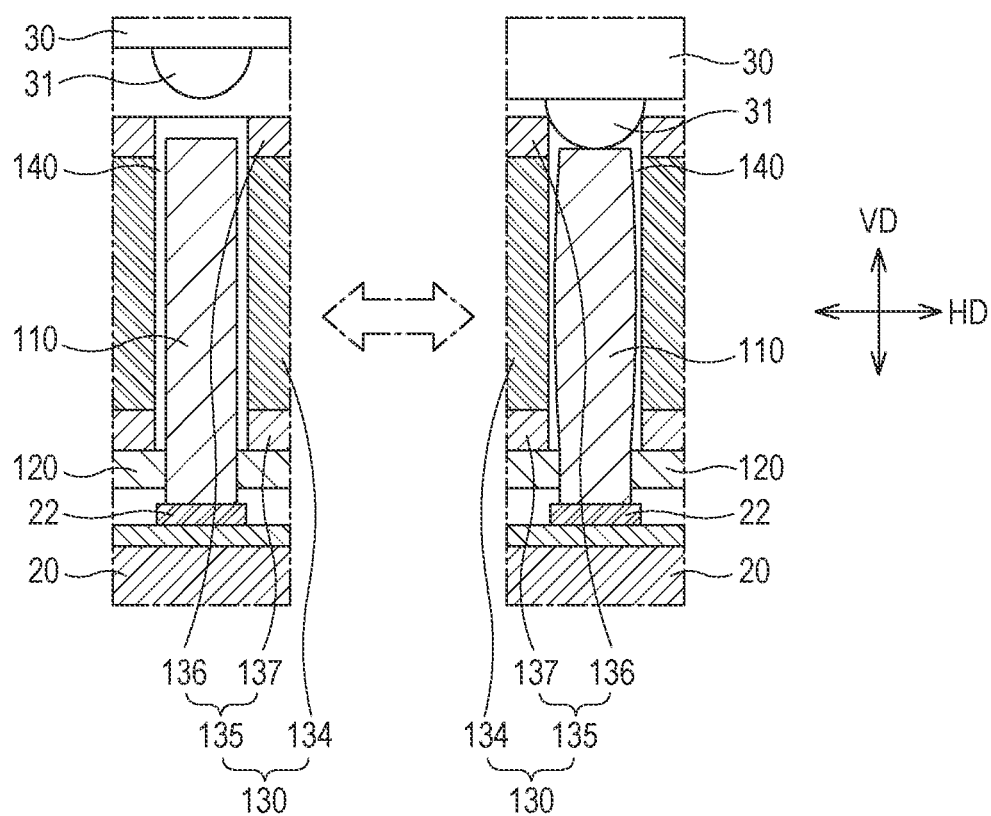
FIG. 4 is a cross-sectional view illustrating an operating state of a portion of the test connector illustrated in FIG. 2.

FIG. 2 is a cross-sectional view illustrating a portion of the test connector of FIG. 1. FIG. 3 is a plan view of a portion of the test connector illustrated in FIG. 2, and FIG. 4 is a cross-sectional view illustrating an operating state of a portion of the test connector illustrated in FIG. 2. FIGS. 2 to 4 will be referred to for description of the shape of the test connector, the shape of the conductor, the shapes of elements constituting the conductor, the shape of the insulator, and the like.

In the test connector 10, the conductor 110 carries out signal transmission between the test device 20 and the device to be inspected in the vertical direction VD. The conductor 110 may have a cylindrical shape extending in the vertical direction VD, but the shape of the conductor 110 is not limited to the cylindrical shape.

As illustrated in FIG. 2, the conductor 110 may include a plurality of conductive particles 111 and an elastic material 112. The plurality of conductive particles 111 are aggregated along the vertical direction VD to be conductive in the vertical direction VD. The conductive particles 111 aggregated to be conductive in the vertical direction VD form the conductor, and the conductor is able to carry out signal transmission in the vertical direction VD within the conductor 110. The conductor made of the conductive particles 111 may have a cylindrical shape as a whole. In this cylindrical shape of the conductor, the size at the lower end may be larger than the size at the middle.

The conductive particles 111 may be made of a highly conductive metal material. The conductive particles 111 may have a form in which a highly conductive metal material is coated on a core made of an elastic resin material or metal material. As another example, the conductive particles 111 may be long and thin fibers or wires, and the fibers or wires may be made of a metal or carbon.

The elastic material 112 of the conductor is in a cured state and has elasticity. The elastic material 112 maintains the conductive particles 111 in the vertical direction VD such that the conductive particles 111 form the shape of the conductor. Gaps between the conductive particles 111 may be filled with the elastic material 112. The elastic material 112 is integrally formed with the plurality of conductive particles 111 to constitute the conductor 110. The elastic material 112 may be insulative. The elastic material 112 may include hardened silicone rubber. An elastic material having conductivity may be used as the elastic material 112.

When pressed, the conductor 110 may be elastically compressively deformable in the vertical direction VD. The conductor 110 including the elastic material 112 has elasticity and may be elastically deformable in the vertical direction VD and the horizontal direction HD. As described with reference to FIG. 1, a pressing force P may be applied to the test connector 10. At the time of testing the device to be inspected, the terminals 31 and 32 (see FIG. 1) of the device to be inspected press the conductors 110 downward. In the present disclosure, the pressed state of the conductors 110 means a state in which the conductors 110 are pressed by the terminals of the device to be inspected. When the conductors 110 are pressed, the conductors 110 may be elastically deformable to be compressed downward while slightly expanding in the horizontal direction HD. When the pressing force P applied to the test connector 10 via the device to be inspected is removed, the conductors 110 may be elastically restored to the original shape thereof from the pressed state. In the present disclosure, the non-pressed state of the conductors 110 means a free state in which the conductors 110 do not receive the pressing force P. It may mean the state in which the conductors 110 maintains the original shape thereof when the conductors 110 are in the non-pressed state. In the test connector 10, the conductors 110 may be reversibly deformable into the non-pressed state and the pressed state.

In the test connector 10, the support 120 is located on the side facing the test device 20. The support 120 is disposed in the horizontal direction HD to constitute a horizontal surface of the test connector 10. The support 120 functions as a support for supporting one conductor 110 or a plurality of conductors 110 in the vertical direction VD. In the test connector 10, at least one conductor 110 and the support 120 may be formed as an integral structure.

The support 120 is integrally coupled with a portion in the vicinity of the lower end of the conductor 110 in the horizontal direction HD. The support 120 is coupled to the lower end portion of the conductor 110 such that the thickness of the support 120 in the vertical direction VD overlaps a portion of the length area of the conductor 110 in the vertical direction VD in the vicinity of the lower end of the conductor 110. The support 120 separates and insulates the plurality of conductors 110 in the horizontal direction HD. The interval of the conductors 110 supported by the support 120 may correspond to the interval (pitch) of the terminals of the device to be inspected. The lower ends of the conductors 110 may protrude downward from a bottom surface 121 of the support 120. In an embodiment (not illustrated), the conductors 110 may be formed such that the lower ends thereof do not protrude from the bottom surface 121 of the support 120.

The support 120 may be made of an insulative material or an insulative and elastic material. The support 120 may be a film disposed on a horizontal plane orthogonal to the vertical direction VD. The film of the support 120 may include polyimide (PI), but the material of the support 120 is not limited thereto. As another example, the support 120 may include the same material as the elastic material 112 of the conductors 110.

The insulator 130 may be formed in the form of a film or a block having a predetermined thickness. The insulator 130 may be made of an insulative material or an insulative and elastic material. The insulator 130 may include several stacked layers. The insulator 130 may include at least one elastic insulating layer 134 to be described later and at least one support insulating layer 135 to be described later. The elastic insulating layer 134 and the support insulating layer 135 may be stacked together in the vertical direction VD. The at least one support insulating layer 135 may include a plurality of support insulating layers.

FIG. 3 schematically illustrates the conductor 110, the through hole 133, and a gap 140, and FIG. 4 schematically illustrates an example of an operating state of the conductor 110. FIG. 3 and the drawing on the left side of FIG. 4 illustrate the above-mentioned non-pressed state of the conductor 110. The drawing on the right side of FIG. 4 illustrates the above-mentioned pressed state of the conductor 110. Hereinafter, elastic deformation and clearance of the conductor 110 will be described with reference to FIGS. 3 and 4.

The insulator 130 has a plurality of through holes 133 into each of which the conductor 110 is inserted in the vertical direction VD. The through holes 133 may be perforated in the insulator 130 in the vertical direction VD. The through holes 133 may extend from the top surface 131 of the insulator 130 to a bottom surface 132 of the insulator 130 in the vertical direction VD. The thickness of the insulator 130 in the vertical direction may correspond to most of the length of the conductor 110 in the vertical direction VD. The conductors 110 may be respectively inserted into the through holes 133 from bottom to top in the state of being supported by the support 120. The insulator 130 faces the device to be inspected in the state in which the conductors 110 are accommodated in the through holes 133 in the vertical direction VD.

The shape of the through hole 133 in the horizontal direction HD may correspond to a cross-sectional shape of the conductor 110. The through hole 133 may have a circular shape when viewed in the vertical direction VD. The through hole 133 may have a cylindrical shape extending in the vertical direction VD. The maximum width of the through hole 133 may be defined as a diameter D1 passing through a central axis CA in a radial direction DD. Here, the radial direction DD means the radial direction of the central axis CA passing through the center of one through hole 133 in the vertical direction VD. The maximum width of the conductor 110 may be defined as a diameter D2 passing through the center of the conductor 110 in the radial direction DD.

In an embodiment, the gap 140 may be formed between the inner circumferential surface of the through hole 133 and the outer circumferential surface of the conductor 110. The gap 140 may be formed by part or all of the inner circumferential surface of the through hole 133 and part or all of the outer circumferential surface of the conductor 110.

The gap 140 may extend in the vertical direction VD. The gap 140 extends in the circumferential direction CD along the outer circumferential surface of the conductor 110. Here, the circumferential direction CD means a circumferential direction with respect to the central axis CA. The gap 140 may be filled with air.

For example, when the conductor 110 is in the non-pressed state, the gap 140 in the horizontal direction HD may have a ring shape (e.g., a shape in which the inner circle and the outer circle are concentrically located). The gap 140 may have a ring shape extending in the vertical direction VD. In the ring-shaped gap, the gap 140 may have a width W1 in the radial direction DD of the central axis CA of the through hole 133. In the non-pressed state of the elastic conductor 110, the width W1 of the gap in the radial direction DD may be maintained substantially constant along the vertical direction VD. When the conductor 110 is in the pressed state, the gap 140 may have an irregular shape along the vertical direction VD.

As another example, in the non-pressed state of the conductor 110, the gap 140 in the horizontal direction may have a shape in which the inner circle in a ring shape is inscribed with the outer circle. This shape may appear when a portion of the conductor 110 is slightly inclined in the horizontal direction HD and a portion of the outer circumferential surface of the conductor 110 is in contact with a portion of the inner circumferential surface of the through hole 133.

When the conductor 110 is in the non-pressed state, all or part of the outer circumferential surface of the conductor 110 may not come into contact with the inner circumferential surface of the corresponding through hole 133. When the gap 140 has the above-mentioned ring shape, the conductor 110 does not come into contact with the through hole 133 throughout the entire gap 140 when the conductor 110 is in the non-pressed state.

In the test connector 10, the gap 140 allows independent elastic deformation of the conductors 110 within the through holes 133, respectively (see FIG. 4). The conductor 110 may be elastically deformed freely within the through hole 133 except for a portion fixed to the support 120. As illustrated in the drawing on the right side of FIG. 4, in the state in which the conductor 110 is pressed by the terminal 31 of the device to be inspected 30, the conductor 110 is contractible in the vertical direction VD and expandable in the horizontal direction HD (or the above-mentioned radial direction) without being restricted by the insulator 130.

Since the gaps 140 separate the conductors 110 and the insulator 130 from each other and allows the conductors 110 to operate individually, at the time of testing the device to be inspected, the gaps 140 may improve the operability of the conductors 110 and the elastic restoring force of the conductors 110. Even if the device to be inspected is pressed against the conductors 110 with a small pressure, the conductors 110 can be elastically deformed easily and exhibit high conductivity. The dimensions of the conductors 110, the through holes 133, and the gaps 140 may be determined for smooth elastic deformation of the conductors 110.

In the state in which the conductors 110 are inserted into the through holes 133, the upper ends of the conductors 110 may be located below the top surface 131 of the insulator 130. Since the ball-shaped first terminals 31 of the device to be inspected (see FIG. 1) can be guided to the conductors 110 by the upper end portions of the through holes 133, the insulator 130 may serve to guide the first terminals of the device to be inspected to the conductors. In an embodiment (not illustrated), an inclined surface may be formed between the top surface 131 of the insulator 130 and the through holes 133 to guide the first terminals of the device to be inspected.

In the embodiment in which the gaps 140 are formed between the inner circumferential surfaces of the through holes 133 and the outer circumferential surfaces of the conductors 110, when the conductors 110 expand in the lateral direction, the outer circumferential surfaces of the conductors 110 may come into contact with the inner circumferential surfaces of the through holes 133, respectively. In a case where only a high-hardness material such as polyimide (PI) is used for the insulator 130, when the outer circumferential surfaces of the conductors 110 come into contact with the inner circumferential surfaces of the through holes 133, the elastic deformation of the conductors 110 may be excessively restricted.

In order to prevent the elastic deformation of the conductors 110 from being excessively restricted, the insulator 130 includes the at least one elastic insulating layer 134 made of an elastic material. The elastic insulating layer 134 may be configured to be elastically compressively deformable in the vertical direction VD when pressed. This makes it possible to configure the elastic insulating layer 134 to be easily deformable, and by preventing the elastic deformation of the conductors 110 from being excessively restricted, the operability of the test connector 10 can be improved.

As the device to be inspected 30 presses downward on the conductors 110 when the conductors 110 are in the pressed state, the conductors 110 can be contracted in the vertical direction VD and expanded in the horizontal direction HD. In the pressed state, the insulator 130 may be pushed downward together with the conductors 110, and in this case, the elastic insulating layer 134 may be elastically compressively deformable in the vertical direction VD. Accordingly, the test device 20 and the device to be inspected 30 can be smoothly connected by the conductors 110 and signals can be smoothly transmitted through the conductors 110, so that the test operability of the test connector 10 can be improved.

The elastic material of the elastic insulating layer 134 may be configured to have a smaller modulus of elasticity than a heat-resistant material to be described later. The elastic material of the elastic insulating layer 134 may be configured to have a smaller hardness than the heat-resistant material to be described later. The elastic material of the elastic insulating layer 134 may include silicone (e.g., silicone rubber). The elastic material of the elastic insulating layer 134 may include urethane. The elastic insulating layer 134 may further include insulating materials for improving durability.

When the elastic insulating layer 134 is made of only an elastic material, silicone or the like may be deformed at a high temperature. In order to solve this problem, the elastic insulating layer 134 may include a heat-resistant material. The elastic insulating layer 134 may be formed by mixing a heat-resistant material and an elastic material. When the elastic insulating layer 134 includes a heat-resistant material, the heat resistance of the elastic insulating layer 134 can be increased and thermal deformation at a high temperature can be prevented or reduced, thereby improving the lifespan of the test connector 10.

The heat-resistant material of the elastic insulating layer 134 may include boron nitride. The heat-resistant material may include carbon or a carbon compound. For example, the carbon compound may be carbon nanotubes (CNTs), graphite, or the like. The heat-resistant material may include any one selected from the group of aluminum, silicon, iron, chromium, and zirconium. The heat-resistant material may include an alloy of any one selected from the group of aluminum, silicon, iron, chromium, and zirconium. The heat-resistant material may include any one selected from the group of polyethylene (PE), polypropylene (PP), and polymethylmethacrylate (PMMA).

The heat-resistant material may include a mixture of at least two or more of the above-mentioned materials. The heat-resistant material may include a mixture obtained by mixing the alloy with another material. For example, a mixture of boron nitride and aluminum or a mixture of polyethylene and carbon may be used as a heat-resistant material.

The weight ratio of the heat-resistant material to the total weight of the elastic insulating layer 134 may be in a range of 10% to 80%. By setting the weight ratio of the heat-resistant material in the above range, it is possible to simultaneously achieve the aspect of securing the operability of the test device 20 and the effect of preventing thermal deformation by the heat-resistant material.

The support insulating layer 135 may be stacked together with the at least one elastic insulating layer 134 in the vertical direction VD. The support insulating layer 135 may be configured to have higher hardness than the elastic insulating layer 134. By stacking the support insulating layer 135 having high hardness in the vertical direction VD of the elastic insulating layer 134, the support insulating layer 135 may be configured to support the elastic insulating layer 134. Since the support insulating layer 135 supports the elastic insulating layer 134, deformation of the elastic insulating layer 134 due to repetitive tests can be prevented. Hardness may be measured by using a Shore hardness tester.

The support insulating layer 135 may be disposed at the upper end and/or the lower end of the insulator 130. The support insulating layer 135 may include an upper end support insulating layer 136 disposed at the upper end of the insulator 130. In the state in which the conductors 110 are pushed by the terminals 31 of the device to be inspected 30, since the upper end support insulating layer 136 is disposed at the upper end of the insulator 130, durability can be improved by suppressing excessive deformation of the upper end of the insulator 130 that is brought into contact with the terminals 31.

The support insulating layer 135 may include a lower end support insulating layer 137 disposed at the lower end of the insulator 130. When the conductors 110 are in a pressed state, since the lower end support insulating layer 137 is disposed at the lower end of the insulator 130, durability can be improved by suppressing deformation by a pressing force applied to the lower end of the insulator 130 by the device to be inspected 30.

The insulator 130 may have a three-layered structure having the lower end support insulating layer 137, the elastic insulating layer 134 disposed on the upper end of the lower end support insulating layer 137, and the upper end support insulating layer 136 disposed on the upper end of the elastic insulating layer 134. Since the support insulating layer 135 is disposed at the upper end and/or the lower end of the insulator 130, deformation of the elastic insulating layer 134 due to repetitive tests can be more effectively prevented. As another embodiment, a two-layered structure of the insulator 130 will be described later with reference to FIGS. 5 and 6. However, the two-layered structure and the three-layered structure of the insulator 130 are merely examples for describing the present disclosure, and in an embodiment (not illustrated), the insulator 130 may have an n-layered structure (n is an integer of 2 or more) in which the plurality of support insulating layers 135 and the plurality of elastic insulating layers 134 are disposed.

The support insulating layer 135 may include a high-hardness heat-resistant material. The support insulating layer 135 may include at least one of polyimide (PI) or polytetrafluoroethylene (PTFE). The support insulating layer 135 may include Flame Retardant 4 (FR4) which is a glass fiber-reinforced epoxy laminated sheet. Since the support insulating layer 135 including polyimide (PI), polytetrafluoroethylene (PTFE), and Flame Retardant 4 (FR4) is heat-resistant, deformation due to a temperature change can be effectively prevented.

Figure 6:
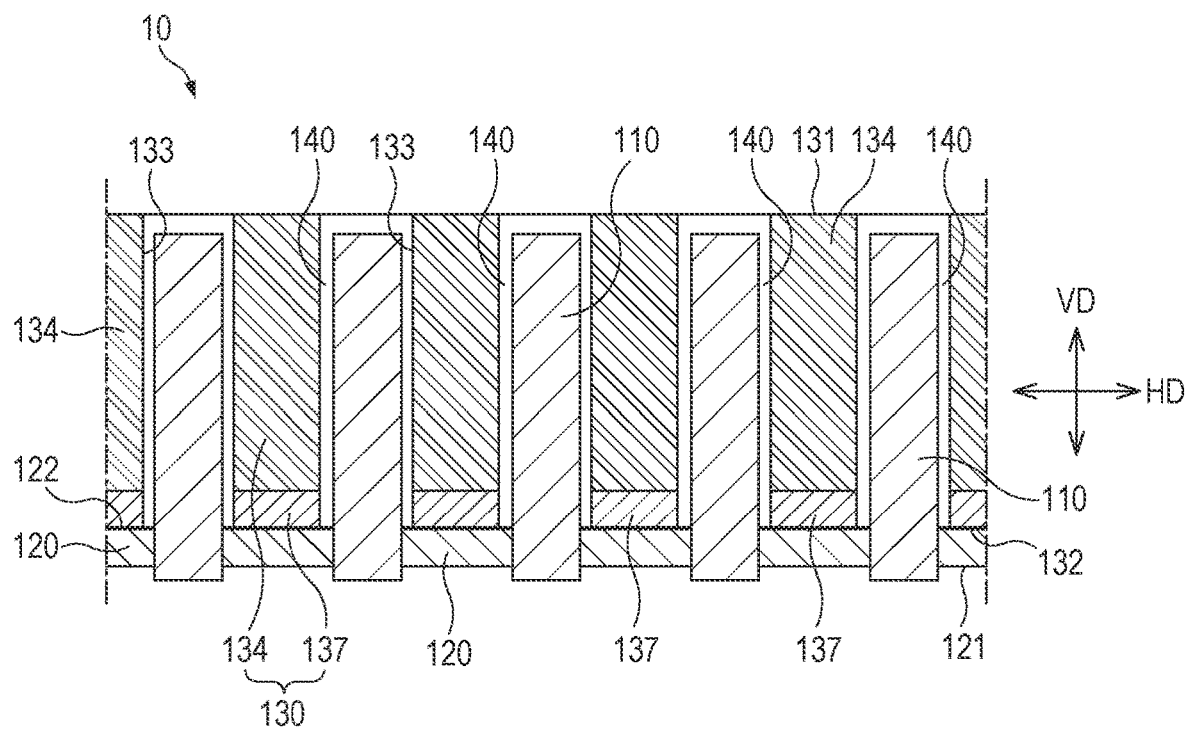
FIG. 6 is a cross-sectional view illustrating a portion of a test connector according to yet another embodiment of the present disclosure.
Figure 7:
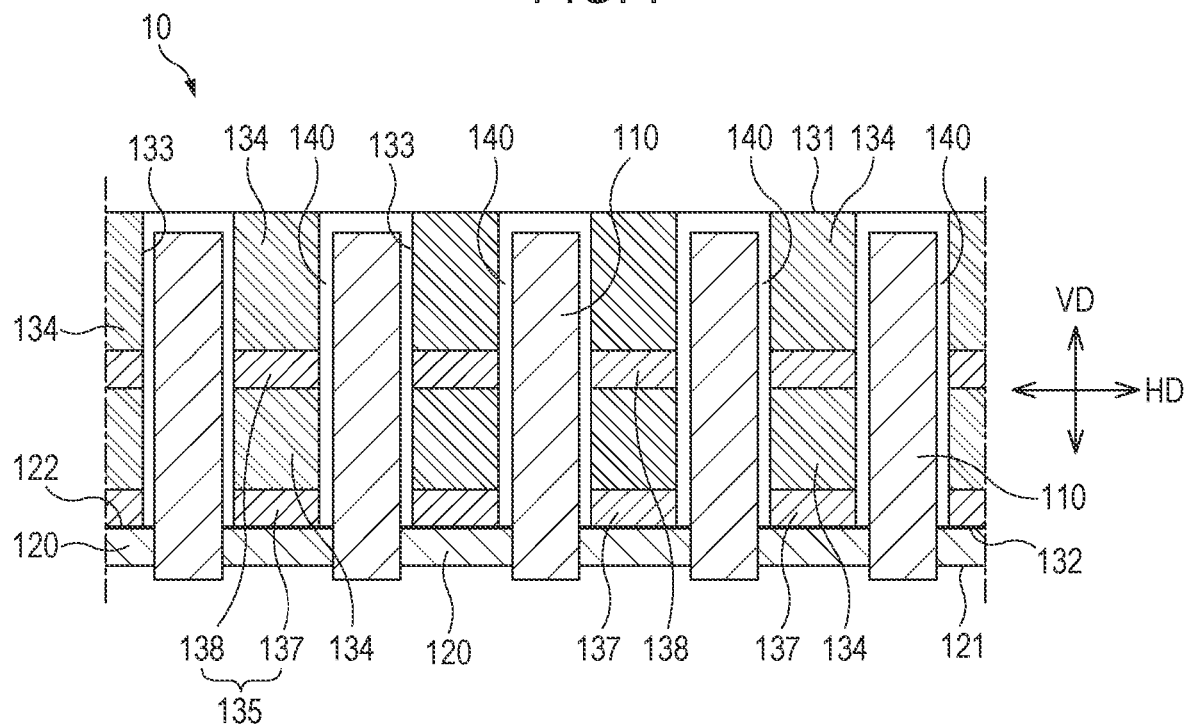
FIG. 7 is a cross-sectional view illustrating a portion of a test connector according to still another embodiment of the present disclosure.
Figure 8:
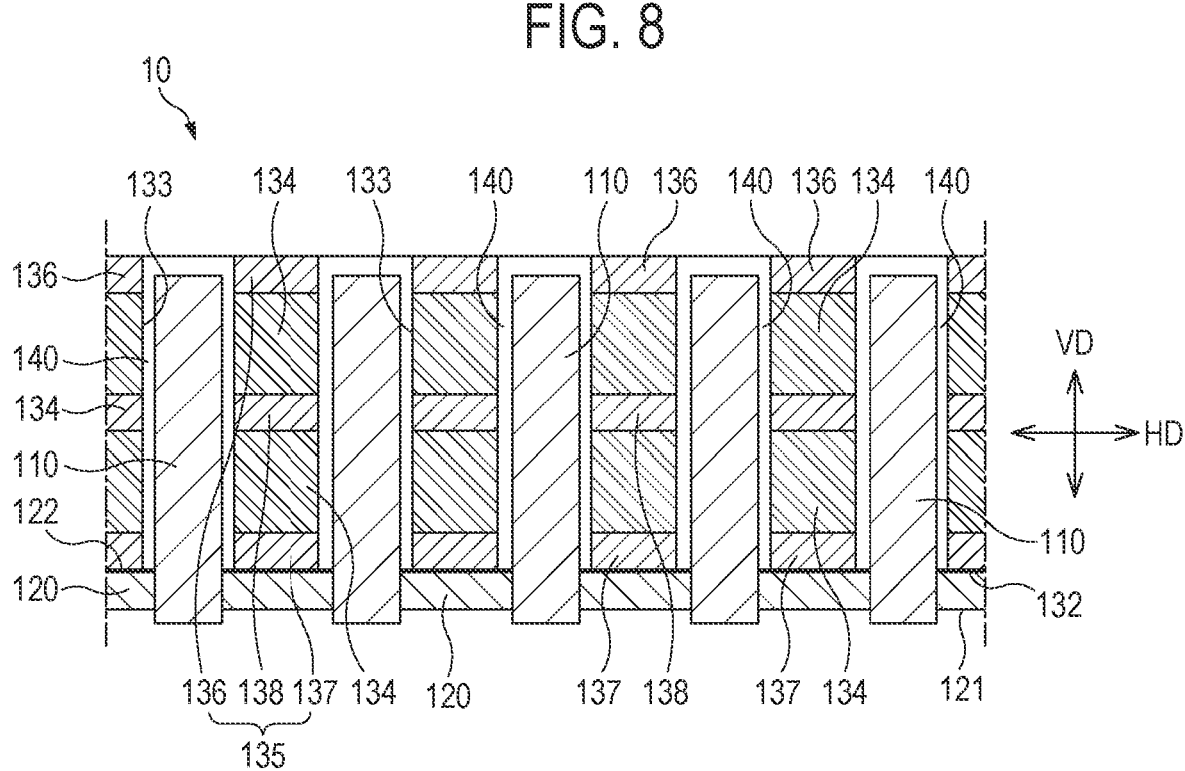
FIG. 8 is a cross-sectional view illustrating a portion of a test connector according to yet another embodiment of the present disclosure.

The at least one elastic insulating layer 134 may include the plurality of elastic insulating layers 134. The sum of the thicknesses of the elastic insulating layers 134 in the vertical direction VD may be in a range of 30% to 95% of the thickness of the insulator 130 in the vertical direction VD. Referring to FIGS. 1 to 6, the thickness of one elastic insulating layer 134 may be in the range of 30% to 95% of the thickness of the insulator 130 in the vertical direction VD. Referring to FIGS. 7 and 8 to be described later, the sum of the thicknesses of the plurality of elastic insulating layers 134 in the vertical direction VD may be in the range of 30% to 95% of the total thickness of the insulator 130 in the vertical direction VD. By setting the sum of the thicknesses of the elastic insulating layers 134 within the above range, silicone can be prevented from being deformed due to heat generated during a test while maintaining an appropriate elastic force by the elastic insulating layer 134.

Figure 5:
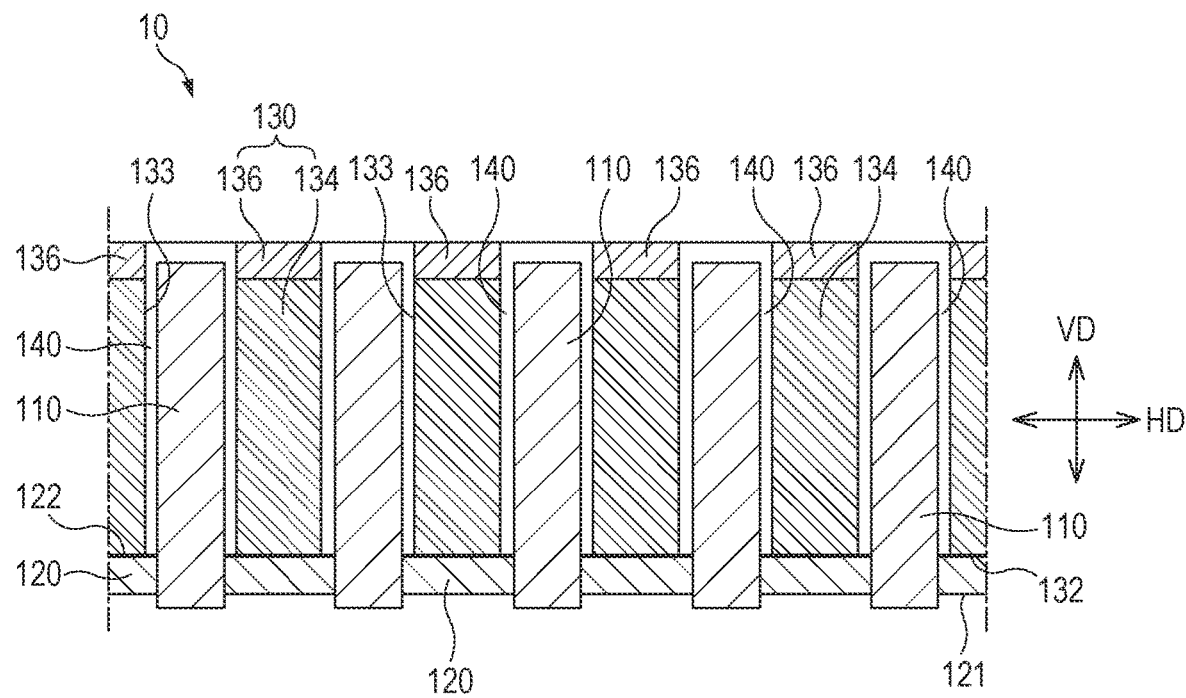
FIG. 5 is a cross-sectional view illustrating a portion of a test connector according to another embodiment of the present disclosure.

FIG. 5 is a cross-sectional view illustrating a portion of a test connector according to another embodiment of the present disclosure. FIG. 6 is a cross-sectional view illustrating a portion of a test connector according to yet another embodiment of the present disclosure. FIG. 7 is a cross-sectional view illustrating a portion of a test connector according to still another embodiment of the present disclosure. FIG. 8 is a cross-sectional view illustrating a portion of a test connector according to yet another embodiment of the present disclosure. FIGS. 5 to 8 will be referred to for a description of specific structures constituting the insulator. Hereinafter, the embodiments according to FIGS. 5 to 8 will be described focusing on differences from the above-described embodiment according to FIG. 2.

Referring to FIG. 5, an insulator 130 may have a two-layered structure having the upper end support insulating layer 136 and an elastic insulating layer 134 disposed on the lower end of the upper end support insulating layer 136. The upper end support insulating layer 136 may be disposed at the upper end of the insulator 130. In this embodiment, the lower support insulating layer is not provided.

Referring to FIG. 6, an insulator 130 may have a two-layered structure having the lower end support insulating layer 137 and an elastic insulating layer 134 disposed on the upper end of the lower end support insulating layer 137. The lower end support insulating layer 137 may be disposed at the lower end of the insulator 130. In this embodiment, the upper end support insulating layer is not provided.

Referring to FIGS. 7 and 8, a plurality of elastic insulating layers 134 disposed in the vertical direction VD may be provided. The plurality of elastic insulating layers 134 may be spaced apart from each other. The support insulating layer 135 may include an intermediate support insulating layer 138 disposed between the plurality of elastic insulating layers 134. The intermediate support insulating layer 138 may be disposed in a space between two elastic insulating layers 134 which are spaced apart from each other.

Since the intermediate support insulating layer 138 is disposed within the insulator 130, the intermediate support insulating layer 138 may distribute the entire pressing force applied to the insulator 130 in the vertical direction VD. The intermediate support insulating layer 138 serves as a center point for a pressing force applied to the upper and lower ends of the insulator 130, thereby improving the operability of the upper and lower portions of the insulator 130.

The insulator may include the upper support insulating layer 136 and/or the lower support insulating layer 137 above and below the intermediate support insulating layer 138. By stacking the intermediate support insulating layer 138 with the upper support insulating layer 136 and/or the lower support insulating layer 137 in the insulator, the operability, durability, and lifespan of the test connector 10 can be improved.

In the illustrated embodiment, the intermediate support insulating layer 138 is configured as a single intermediate support insulating layer 138, but in an embodiment (not illustrated), the intermediate support insulating layer 138 may include a plurality of intermediate support insulating layers 138 each of which is disposed between the two elastic insulating layers 134.

According to the embodiments of the present disclosure, while improving the operability of a test connector by having an appropriate elastic restoration force by the at least one elastic insulating layer, a pressing force applied to the insulator in the vertical direction can be evenly distributed by at least one support insulating layer stacked in the vertical direction together with the elastic insulating layer.

According to the embodiments of the present disclosure, by forming the gap between the conductor and the insulator, the conductor has improved operability and an elastic restoration force. In addition, since the conductors are operable by coming into contact with different terminals, respectively, the conductors can be brought into appropriate contact with terminals having different heights.

According to an embodiment of the present disclosure, since the elastic insulating layer includes a heat-resistant material, thermal deformation at a high temperature can be prevented or reduced, and the lifespan of a product can be improved.

Although the present disclosure has been described in relation to some embodiments, it should be noted that there may be various modifications and changes without departing from the scope of the present disclosure, which can be understood by those skilled in the art. In addition, such modifications and changes should be construed to belong to the scope of the claims appended herein.

What is claimed is:

1. A test connector disposed between a test device and a device to be inspected, the test connector comprising:
    at least one conductor configured to be conductive in a vertical direction and be elastically compressively deformable in the vertical direction when pressed;
    a support configured to support the at least one conductor; and
    an insulator having at least one through hole into which the at least one conductor is inserted in the vertical direction and being coupled to the support, the insulator having an inner circumferential surface defining the at least one through hole,
    wherein a gap is formed between the inner circumferential surface and an outer circumferential surface of the at least one conductor,
    wherein the insulator comprises:
    at least one elastic insulating layer that is elastically compressively deformable in the vertical direction when pressed and comprises an elastic material; and
    at least one support insulating layer that is stacked in the vertical direction together with the at least one elastic insulating layer and has higher hardness than the at least one elastic insulating layer,
    wherein the at least one elastic insulating layer and the at least one support insulating layer are separated from the outer circumferential surface of the at least one conductor by the gap,
    wherein the at least one support insulating layer comprises an upper end support insulating layer disposed at an upper end of the insulator and a lower end support insulating layer disposed at a lower end of the insulator, and
    wherein the gap is formed between an inner circumferential surface of the lower end support insulating layer and the outer circumferential surface of the at least one conductor.

2. The test connector of claim 1, wherein the at least one elastic insulating layer comprises a heat-resistant material.

3. The test connector of claim 2, wherein the heat-resistant material comprises boron nitride.

4. The test connector of claim 2, wherein the heat-resistant material comprises carbon or a carbon compound.

5. The test connector of claim 2, wherein the heat-resistant material comprises any one selected from the group of aluminum, silicon, iron, chromium, and zirconium.

6. The test connector of claim 2, wherein the heat-resistant material comprises an alloy of any one selected from the group of aluminum, silicon, iron, chromium, and zirconium.

7. The test connector of claim 2, wherein the heat-resistant material comprises any one selected from the group of polyethylene, polypropylene, and polymethyl methacrylic acid.

8. The test connector of claim 2, wherein a weight ratio of the heat-resistant material to a total weight of the at least one elastic insulating layer is in a range of 10% to 80%.

9. The test connector of claim 1, wherein the at least one elastic insulating layer comprises two elastic insulating layers disposed in the vertical direction, and
    wherein the at least one support insulating layer comprises an intermediate support insulating layer disposed between the two elastic insulating layers.

10. The test connector of claim 1, wherein a sum of thicknesses of the at least one elastic insulating layer in the vertical direction is in a range of 30% to 95% of a thickness of the insulator in the vertical direction.

11. The test connector of claim 1, wherein the at least one support insulating layer comprises at least one of polyimide or polytetrafluoroethylene.

12. The test connector of claim 1, wherein the at least one support insulating layer comprises FR4.

13. The test connector of claim 1, wherein the elastic material comprises silicone.

14. The test connector of claim 1, wherein the elastic material comprises urethane.

15. The test connector of claim 2, wherein the heat-resistant material comprises any one selected from the group of:
    boron nitride;
    carbon or a carbon compound;
    any one selected from the group of aluminum, silicon, iron, chromium, and zirconium;
    an alloy of any one selected from the group of aluminum, silicon, iron, chromium, and zirconium; and
    any one selected from the group of polyethylene, polypropylene, and polymethyl methacrylic acid.

* * * * *